United States Patent
Matsunaga et al.

(10) Patent No.: US 12,097,864 B2
(45) Date of Patent: Sep. 24, 2024

(54) MOBILE OBJECT CONTROL DEVICE AND MOBILE OBJECT CONTROL METHOD

(71) Applicant: HONDA MOTOR CO., LTD., Tokyo (JP)

(72) Inventors: Hideki Matsunaga, Wako (JP); Yuji Yasui, Wako (JP); Takashi Matsumoto, Wako (JP); Gakuyo Fujimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 277 days.

(21) Appl. No.: 17/704,137

(22) Filed: Mar. 25, 2022

(65) Prior Publication Data
US 2022/0315015 A1 Oct. 6, 2022

(30) Foreign Application Priority Data
Mar. 30, 2021 (JP) ................................. 2021-056993

(51) Int. Cl.
B60W 40/105 (2012.01)
G01C 21/36 (2006.01)
H04W 64/00 (2009.01)

(52) U.S. Cl.
CPC ....... *B60W 40/105* (2013.01); *G01C 21/3605* (2013.01); *H04W 64/006* (2013.01);
(Continued)

(58) Field of Classification Search
CPC ......... B60W 40/105; B60W 2540/227; B60W 2554/4041; B60W 2554/4049;
(Continued)

(56) References Cited

U.S. PATENT DOCUMENTS

2022/0314987 A1* 10/2022 Matsunaga ........... B60W 40/06
2022/0315006 A1* 10/2022 Matsunaga ........... B60W 50/10
2022/0315026 A1* 10/2022 Matsunaga .......... G08G 1/0141

FOREIGN PATENT DOCUMENTS

EP           2045178      4/2009
JP           2009-089758  4/2009
(Continued)

OTHER PUBLICATIONS

Japanese Office Action for Japanese Patent Application No. 2021-056993 mailed May 21, 2024.

*Primary Examiner* — Xiao En Mo
(74) *Attorney, Agent, or Firm* — Amin, Turocy & Watson, LLP (57) ABSTRACT

A hardware processor of a mobile object executes the program stored in a storage device to acquire reference information with which a facility where an occupant is likely to stop by is identifiable; to recognize whether a mobile object is moving on a roadway or a predetermined region different from the roadway; to recognize presence of a contact portion between the predetermined region and the roadway in a traveling direction of the mobile object; to partially control a speed of the mobile object; to limit a speed of the mobile object moving on the roadway to a first speed; to limit a speed of the mobile object moving on the predetermined region to a second speed lower than the first speed; and to bring a speed of the mobile object to the second speed when the mobile object is moving on the roadway, the contact portion is recognized within a predetermined range from the mobile object, and it is determined with reference to the reference information that there is a facility where the occupant is likely to stop by on a side on which there is the contact portion from the look of the roadway.

16 Claims, 8 Drawing Sheets

(52) U.S. Cl.
CPC .......... *B60W 2540/227* (2020.02); *B60W 2554/4041* (2020.02); *B60W 2554/4049* (2020.02)

(58) Field of Classification Search
CPC .......... B60W 30/18009; B60W 50/14; B60W 60/001; B60W 2420/403; B60W 2552/05; G01C 21/3605; H04W 64/006
See application file for complete search history.

(56) References Cited

FOREIGN PATENT DOCUMENTS

| | | |
|---|---|---|
| JP | 2016-212120 | 12/2016 |
| JP | 2017-100490 | 6/2017 |
| JP | 2020-121573 | 8/2020 |
| JP | 2020-185889 | 11/2020 |
| JP | 2020-189536 | 11/2020 |
| WO | 2016/148204 | 9/2016 |

\* cited by examiner

| NAME OR LIKE OF FACILITY | POSITION | ATTRIBUTE |
|---|---|---|
| AAA | (XX, YY) | CHARGING STANDS FOR ELECTRIC AUTOMOBILE |
| BBB | (XX, YY) | RESTAURANT(WESTERN STYLE BAR) |
| CCC | (XX, YY) | PARK(THERE ARE STANDS) |
| ... | ... | ... |

| USER ID | ORIENTATION INFORMATION | FACILITY USE HISTORY |
|---|---|---|
| 111 | SWEETS, MOVIE | ○○MOVIE THEATER,20210305<br>△△PARK,20210302 |
| 222 | SOMETHING SPICY, SOCCER | ■■COAT, 20210301<br>... |
| ... | ... | ... |

MOBILE OBJECT CONTROL DEVICE AND MOBILE OBJECT CONTROL METHOD

CROSS-REFERENCE TO RELATED APPLICATION

Priority is claimed on Japanese Patent Application No. 2021-056993, filed Mar. 30, 2021, the content of which is incorporated herein by reference.

BACKGROUND

Field of the Invention

The present invention relates to a mobile object control device and a mobile object control method.

Description of Related Art

In the related art, the invention of a one-person riding electromotive vehicle capable of moving on a sidewalk has been disclosed (see Japanese Unexamined Patent Application, First Publication No. 2020-189536).

SUMMARY

Technologies of the related art have not taken into account mobile objects capable of moving on both roadways and predetermined regions different from roadways. Therefore, appropriate control cannot be performed at the time of entrance to predetermined regions from roadways in some cases.

The present invention is devised in view of such circumstances and an objective of the present invention is to provide a mobile object control device and a mobile object control method capable of appropriately controlling a mobile object capable of moving on both a roadway and a predetermined region different from the roadway at the time of entrance to a predetermined region from a roadway.

A mobile object control device and a mobile object control method according to the present invention adopt the following configurations.

(1) According to an aspect of the present invention, a mobile object control device includes a storage device storing a program and a hardware processor. The hardware processor executes the program stored in the storage device to: acquire reference information with which a facility where an occupant is likely to stop by is identifiable; recognize whether a mobile object is moving on a roadway or a predetermined region different from the roadway; to recognize presence of a contact portion between the predetermined region and the roadway in a traveling direction of the mobile object; control the speed of the mobile object at least partially; limit a speed of the mobile object moving on the predetermined region to a second speed lower than the first speed; and bring a speed of the mobile object to the second speed when the mobile object is moving on the roadway, the contact portion is recognized within a predetermined range from the mobile object, and it is determined with reference to the reference information that there is a facility where the occupant is likely to stop by on a side on which there is the contact portion from the look of the roadway.

(2) In the mobile object control device according to the aspect (1), the hardware processor may question about an intention to enter the predetermined region using an interface device when the mobile object is moving on the roadway, the contact portion is recognized within a predetermined range from the mobile object, and it is determined with reference to the reference information that there is the facility where the occupant is likely to stop by on the side on which there is the contact portion when seen from the look of the roadway, and a speed of the mobile object may bring the second speed when a positive response is obtained.

(3) In the mobile object control device according to the aspect (1), the hardware processor may acquire the reference information from another device through a communication device. The other device may retain information regarding an orientation of the occupant and information regarding the facility and transmit information regarding the facility matching the information regarding the orientation of the occupant as the reference information to the communication device.

(4) In the mobile object control device according to the aspect (1), the hardware processor may acquire the reference information from another device through a communication device. The other device may retain information regarding a facility use history of the occupant and transmit information which is based on the information regarding the facility use history as the reference information to the communication device.

(5) In the mobile object control device according to the aspect (1), the hardware processor may acquire the reference information from another device through a communication device. The other device may be a device that performs route guidance through the communication device and transmits information regarding a facility set as a destination by the occupant as the reference information to the communication device.

(6) In the mobile object control device according to the aspect (1), the hardware processor may acquire the reference information from another device through a communication device. The other device may be a device that retains information regarding an energy supply facility and transmits information regarding the energy supply facility as part of the reference information to the communication device. The hardware processor may further acquire information regarding a remaining energy amount of the mobile object as another part of the reference information and determine that the energy supply facility is a facility where the occupant is likely to stop by when a value indicating the remaining energy amount of the mobile object is less than a reference.

(7) In the mobile object control device according to the aspect (1), the hardware processor may acquire the reference information from a storage device mounted in the mobile object. The storage device may retain information regarding an orientation of the occupant and information regarding a facility. The hardware processor may acquire information regarding a facility matching the information regarding.

(8) In the mobile object control device according to the aspect (1), the hardware processor may acquire the reference information from a storage device mounted in the mobile object. The storage device may retain information regarding a facility use history of the occupant and the acquirer acquires information which is based on the information regarding the facility use history as the reference information.

(9) In the mobile object control device according to the aspect (1), the hardware processor may acquire information regarding a facility set as a destination by the occupant as the reference information from a device that is mounted in the mobile object and performs route guidance.

(10) In the mobile object control device according to the aspect (1), the hardware processor may acquire information regarding an energy supply facility as part of the reference information from a storage device that is mounted in the mobile object and retains the information regarding the energy supply facility, further acquire information regarding a remaining energy amount of the mobile object as another part of the reference information, and determine that the energy supply facility is a facility where the occupant is likely to stop by when a value indicating the remaining energy amount of the mobile object is less than a reference.

(11) In the mobile object control device according to the aspect (1), the hardware processor may recognize whether the mobile object is moving on the roadway or the predetermined region based on an output of an outside world detection device detecting an outside situation of the mobile object.

(12) In the mobile object control device according to the aspect (1), the hardware processor may recognize whether the mobile object is moving on the roadway or the predetermined region based on a manipulation of the occupant on a switch provided inside the mobile object.

(13) In the mobile object control device according to the aspect (1), the hardware processor may recognize that the mobile object is moving on the predetermined region, the hardware processor causes an external report device to report the mobile object which is moving on the predetermined region to the outside of the mobile object.

(14) According to another aspect of the present invention, a mobile object control method is performed by a computer controlling a mobile object on which at least one occupant gets and which is capable of moving both on a roadway and a predetermined region different from the roadway, the method comprising: acquiring reference information with which a facility where an occupant is likely to stop by is identifiable; recognizing whether a mobile object is moving on the roadway or the predetermined region; recognizing presence of a contact portion between the predetermined region and the roadway in a traveling direction of the mobile object; controlling the speed of the mobile object at least partially; limiting a speed of the mobile object moving on the roadway to a first speed; limiting a speed of the mobile object moving on the predetermined region to a second speed lower than the first speed; and bringing a speed of the mobile object to the second speed when the mobile object is moving on the roadway, the contact portion is recognized within a predetermined range from the mobile object, and it is determined with reference to the reference information that there is a facility where the occupant is likely to stop by on a side on which there is the contact portion from the look of the roadway.

(15) According to another aspect of the present invention, a mobile object control device includes a storage device storing a program and a hardware processor. The hardware processor executes the program stored in the storage device to: acquire reference information with which a facility where an occupant is likely to stop by is identifiable; recognize whether a mobile object is moving on a roadway or a predetermined region different from the roadway; recognize presence of a contact portion between the predetermined region and the roadway in a traveling direction of the mobile object; control the speed of the mobile object at least partially; limit a speed of the mobile object moving on the roadway to a first speed; limit a speed of the mobile object moving on the predetermined region to a second speed lower than the first speed; and suggest deceleration to the occupant using an interface device when the mobile object is moving on the roadway, the contact portion is recognized within a predetermined range from the mobile object, and it is determined with reference to the reference information that there is a facility where the occupant is likely to stop by on a side on which there is the contact portion from the look of the roadway.

(16) According to another aspect of the present invention, a mobile object control method is performed by a computer controlling a mobile object on which at least one occupant gets and which is capable of moving both on a roadway and a predetermined region different from the roadway, the method comprising: acquiring reference information with which a facility where an occupant is likely to stop by is identifiable; recognizing whether a mobile object is moving on the roadway or the predetermined region; recognizing presence of a contact portion between the predetermined region and the roadway in a traveling direction of the mobile object; controlling the speed of the mobile object at least partially; limiting a speed of the mobile object moving on the roadway to a first speed; limiting a speed of the mobile object moving on the predetermined region to a second speed lower than the first speed; and suggesting deceleration to the occupant using an interface device when the mobile object is moving on the roadway, the contact portion is recognized within a predetermined range from the mobile object, and it is determined with reference to the reference information that there is a facility where the occupant is likely to stop by on a side on which there is the contact portion from the look of the roadway.

According to the aspects (1) to (16), it is possible to appropriately control a mobile object capable of moving on both a roadway and a predetermined region different from the roadway at the time of entrance to a predetermined region from a roadway.

DETAILED DESCRIPTION

Hereinafter, an embodiment of a mobile object control device and a mobile object control method according to the present invention will be described with reference to the drawings. A mobile object moves on both a roadway and a predetermined region different from the roadway. The predetermined region is, for example, a sidewalk. The predetermined region may be some or all of a roadside strip, a bicycle lane, a public open space, and the like or may include all of a sidewalk, a roadside strip, a bicycle lane, and a public open space. In the following description, the predetermined region is assumed to be a sidewalk. In the following description, a portion described as a "sidewalk" can be appropriately replaced with the "predetermined region."

First Embodiment

Figure 1:
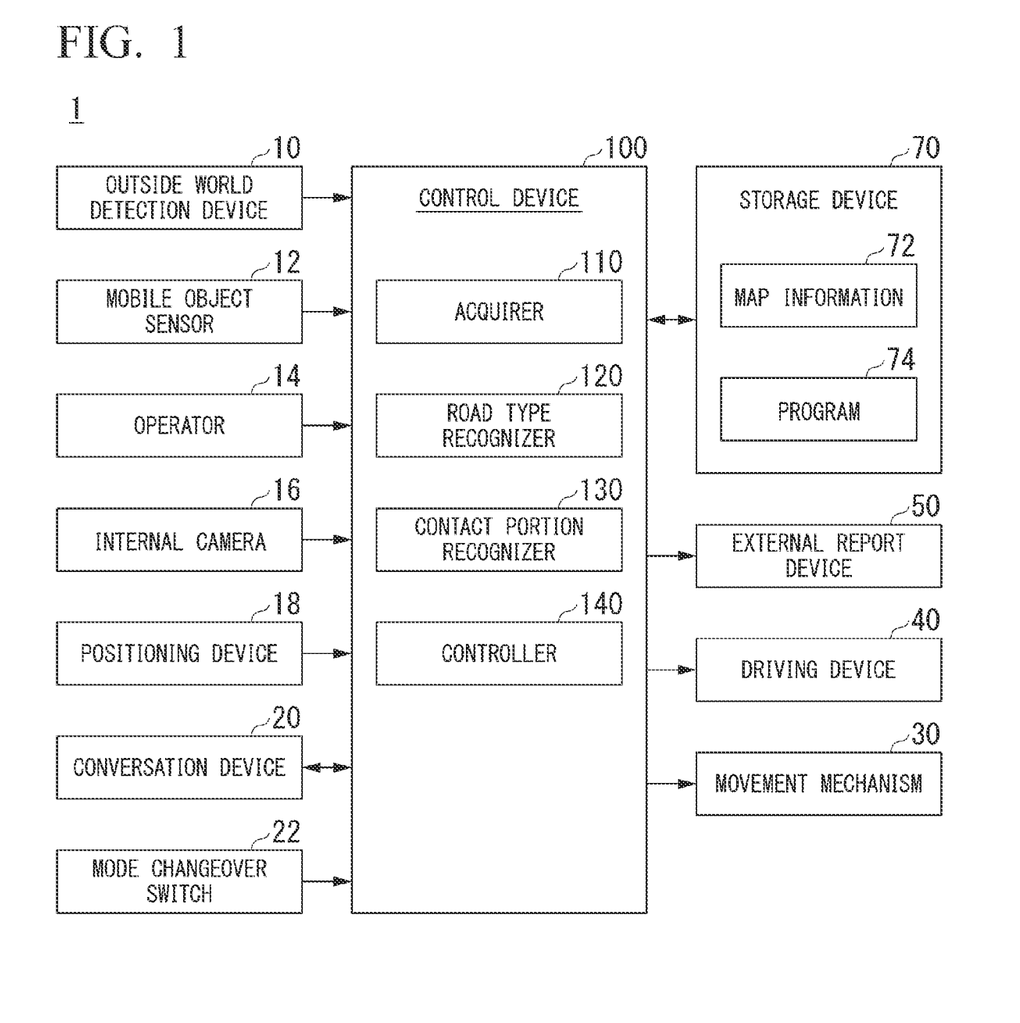
FIG. 1 is a diagram illustrating an exemplary configuration of a mobile object and a control device according to an embodiment.

FIG. 1 is a diagram illustrating an exemplary configuration of a mobile object 1 and a control device 100 according to an embodiment. In the mobile object 1, for example, an outside world detection device 10, a mobile object sensor 12, an operator 14, an internal camera 16, a positioning device 18, a conversation device 20, a mode changeover switch 22, a movement mechanism 30, a driving device 40, an external report device 50, a storage device 70, and a control device 100 are mounted. Of these constituents, some of the constituents unnecessary to implement functions of the present invention may be omitted.

The outside world detection device 10 is any of various devices in which a traveling direction of the mobile object 1 is a detection range. The outside world detection device 10 includes an external camera, a radar device, a light detection and ranging (LIDAR) device, and a sensor fusion device. The outside world detection device 10 outputs information (an image, a position of an object, or the like) indicating a detection result to the control device 100.

The mobile object sensor 12 includes, for example, a speed sensor, an acceleration sensor, a yaw rate (angular velocity) sensor, an azimuth sensor, a voltage sensor, a current sensor, and a temperature sensor mounted on a battery BT (to be described below), and a manipulation amount detection sensor or the like mounted on the operator 14. The operator 14 includes, for example, an operator (for example, an accelerator pedal or a brake pedal) for giving an instruction for an acceleration or deceleration speed and an operator (for example, a steering wheel) for giving an instruction for steering. In this case, the mobile object sensor 12 may include an accelerator opening sensor, a brake step sensor, and a steering torque sensor. The mobile object 1 may include an operator (for example, a rotational operator with no annular shape, a joystick, a button, or the like) other than the above sensor as the operator 14.

The internal camera 16 images at least the head of an occupant of the mobile object 1 in front. The internal camera 16 is a digital camera using an image sensor such as a charge coupled device (CCD) camera or a complementary metal oxide semiconductor (CMOS) camera. The internal camera 16 outputs captured images to the control device 100.

The positioning device 18 is a device that locates a position of the mobile object 1. The positioning device 18 is for example, global navigation satellite system (GNSS) receiver, identifies a position of the mobile object 1 based on signals received from GNSS satellites, and outputs the position as positional information. The positional information of the mobile object 1 may be estimated from a position of a Wi-Fi base station to which a communication device to be described below is connected.

Figure 2:
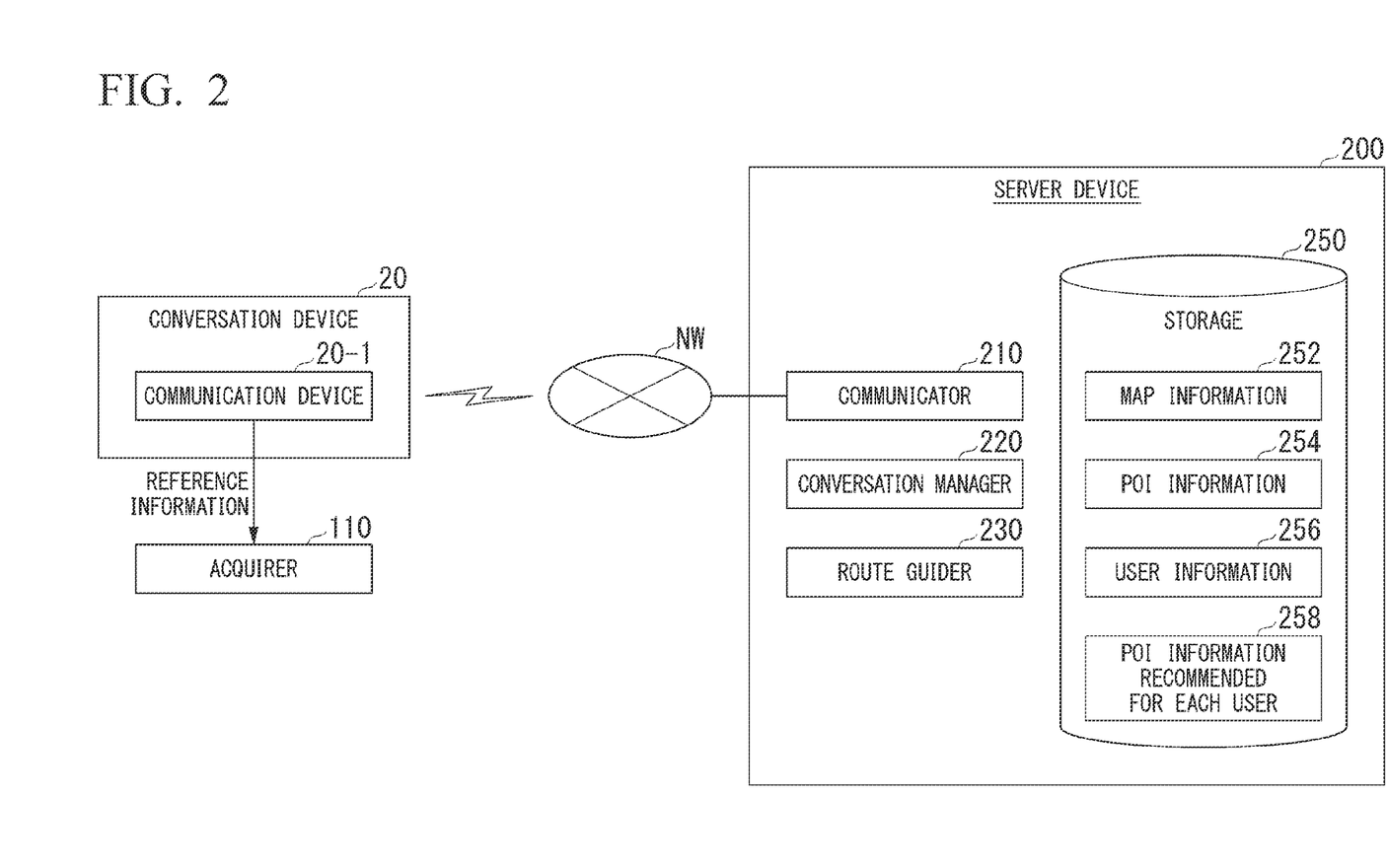
FIG. 2 is a diagram illustrating a conversation device and a server device.

The conversation device 20 includes, for example, a speaker, a microphone, a touch panel, and a communication device. The conversation device 20 is also called an agent device, a concierge device, an assistance device, or the like in some cases. FIG. 2 is a diagram illustrating a conversation device 20 and a server device 200. The conversation device 20 appropriately processes a vocal sound of an occupant collected by the microphone, causes a communication device 20-1 to transmit the processed sound to the server device 200 via a network NW, and supplies information by the sound from the speaker based on information replied from the server device 200. The conversation device 20 may receive an input of a manipulated GUI switch or the like alone other than a sound.

The communication device 20-1 communicates with the server device 200 via the network NW. The network NW includes a wide area network (WAN), a local area network (LAN), and a cellular network. The acquirer 110 acquires reference information from the server device 200 via the communication device 20-1. The communication device 20-1 may periodically transmit positional information of the mobile object 1 to the server device 200. Definition of the reference information will be described below.

The server device 200 includes, for example, a communicator 210, a conversation manager 220, a route guider 230, and a storage 250. The storage 250 stores information such as map information 252, a point of interest (POI) information 254 (an example of facility information), user information 256, and Recommended POI information 258 for each user.

The communicator 210 is a communication interface such as a network card for connection to the network NW. The conversation manager 220 has a sound recognition function, a natural language processing function, a meaning interpretation function, a reply content determination function, and the like. The route guider 230 determines a route with reference the map information 252 when a present position and a destination are input and performs sound guidance using the conversation device 20 so that the mobile object 1 can move along the determined route. The map information 252 expresses, for example, roads with nodes and links.

Figure 3:
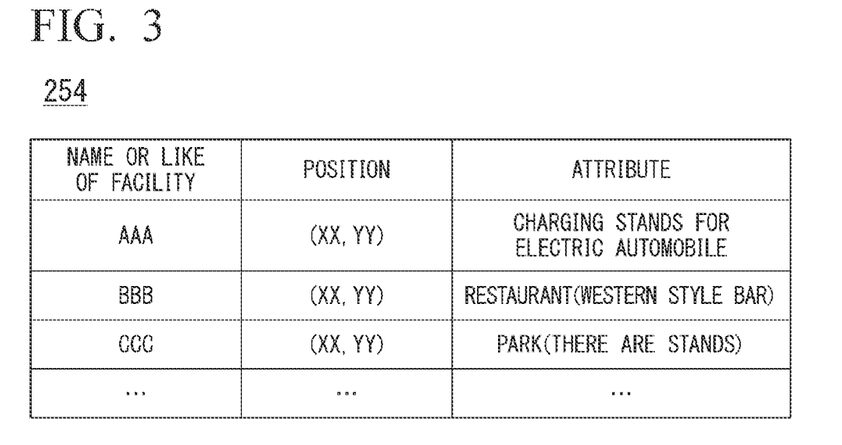
FIG. 3 is a diagram illustrating an example of content of POI information.

The conversation device 20 may transmit positional information and a guidance request (for example, "Where is a delicious noodle shop nearby?") coming from an occupant to the server device 200. The conversation manager 220 of the server device 200 may acquire information regarding a corresponding facility in accordance with the positional information and the guidance request from the POI information 254 and reply to the conversation device 20. In this case, a sound guidance such as "If you turn left ahead, it is there" is performed by the conversation device 20. The present invention is not limited thereto. The conversation device 20 has a function of receiving a natural speech from an occupant and returning an appropriate reply. FIG. 3 is a diagram illustrating an example of content of the POI information 254. In the POI information 254, information such as a position and an attribute is associated with the name or the like of a facility. The attribute is information indicating categories of facilities such as restaurants (more specifically, detailed information such as Italian, noodle shops, oden shops may be included), energy supply facilities (charging stands or gas stations), convenience stores, and soccer coats.

Figure 4:
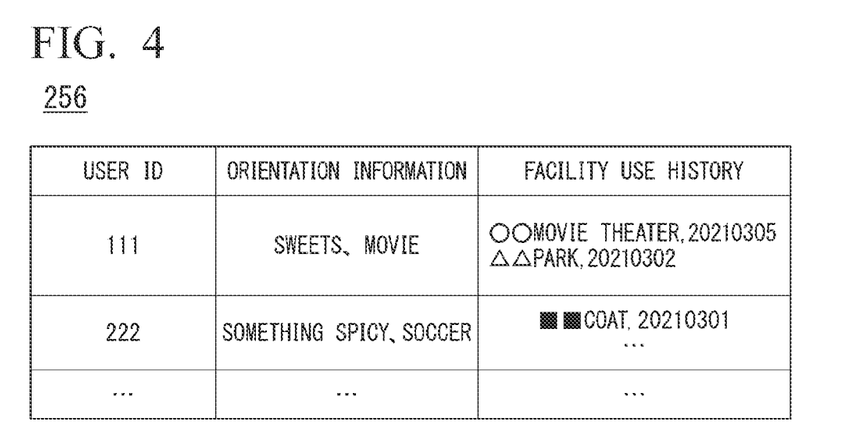
FIG. 4 is a diagram illustrating an example of content of user information.

FIG. 4 is a diagram illustrating an example of content of the user information 256. In the user information 256 retained in the storage 250 of the server device 200, orientation information or information of a facility use history are associated with identification information (a user ID) of a user. The orientation information is, for example, information regarding categories of preference restaurants, interests, or the like. The orientation information is generated in advance based on content of past conversation obtained using the conversation device 20, a facility visited by an occupant and estimated to refer to a movement history of the mobile object 1. The facility use history is information including a visit date and a facility visited by an occupant and estimated to refer to a movement history of the mobile object 1 among facilities registered in the POI information 254.

The conversation manager 220 may generate the Recommended POI information 258 for each user based on the POI information 254 and the user information 256. With regard to the Recommended POI information 258 for each user, for example, information regarding a facility matching the orientation information for each occupant who is a user, information regarding a facility visited by an occupant after a predetermined time (for example, a time such as two years ago) among facilities used in the past are collected.

The server device 200 extracts information around positional information acquired from the communication device 20-1 or in response to a request from the conversation device 20 as the above-described various kinds of information and automatically transmits the information to the communication device 20-1. Thus, various kinds of information retained by the server device 200 is supplied to the conversation device 20 and part of the information is supplied as the reference information to the acquirer 110.

The conversation device 20 may have a function of performing a simple conversation without involvement with the server device, such as a function of asking a question from a device side and receiving a reply, and thus may question an occupant in response to a request from the control device 100. The conversation device 20 is an example of an interface device.

Referring back to FIG. 1, the mode changeover switch 22 is a switch manipulated by an occupant. The mode changeover switch 22 may be a mechanical switch or may be a graphical user interface (GUI) switch set on a touch panel. The mode changeover switch 22 receives a manipulation of switching a driving mode to any one of, for example, mode A which is a speed assistance mode in which a steering manipulation is performed by an occupant and acceleration or deceleration speed control is automatically performed: mode B which is a manual driving mode in which a steering manipulation and an acceleration or deceleration speed manipulation are performed by an occupant, and mode C which is an automated driving mode in which manipulation control and acceleration or deceleration speed control are automatically performed.

The movement mechanism 30 is a mechanism that moves the mobile object 1 on a road. The movement mechanism 30 is, for example, a wheel group including a steering wheel and driving wheel. The movement mechanism 30 may be each section for multiple walking.

The driving device 40 outputs a force to the movement mechanism 30 to move the mobile object 1. For example, the driving device 40 includes a motor driving the driving wheel, a battery storing power to be supplied to the motor, and a steering device that adjust a steering angle of the steering wheel. The driving device 40 may include an internal combustion engine or a fuel cell as a driving power output unit or a power generation unit. The driving device 40 may further include a brake device operating with a frictional force or air resistance.

The external report device 50 is provided in an external plate unit of the mobile object 1 and is, for example, a lamp, a display device, a speaker, or the like for reporting information to the outside of the mobile object 1. The external report device 50 performs different operations between a state in which the mobile object 1 is moving on a sidewalk and a state in which the mobile object 1 is moving on a roadway. For example, the external report device 50 performs control such that a lamp is caused to emit light when the mobile object 1 is moving on a sidewalk, and the lamp is caused not to emit light when the mobile object 1 is moving on a roadway. The color of the light emitted from the lamp may be appropriate color determined by laws. When the external report device 50 is a display device, the external report device 50 displays an indication of "traveling on a sidewalk" in text or a graph in a case in which the mobile object 1 is traveling on a sidewalk.

Figure 5:
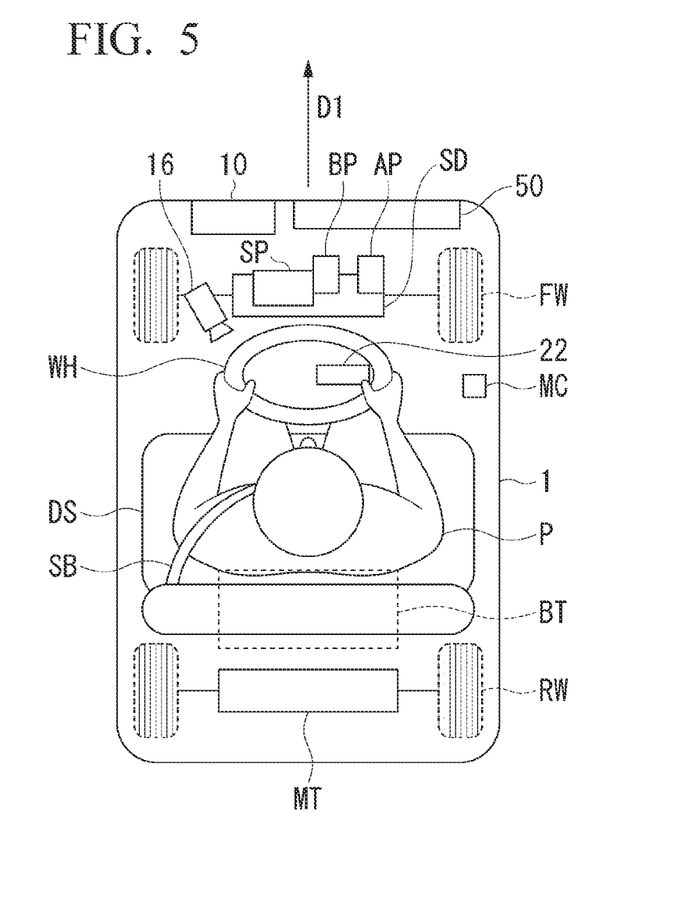
FIG. 5 is a perspective view illustrating the mobile object when viewed from the upper side.

FIG. 5 is a perspective view illustrating the mobile object 1 when viewed from the upper side. In the drawing, FW denotes a steering wheel, RW denotes a driving wheel, SD is a steering device, MT denotes a motor, and BT denotes a battery. AP denotes an accelerator pedal, BP denotes a brake pedal, WH denotes a steering wheel, SP denotes a speaker, and MC denotes a microphone. The illustrated mobile object 1 is a one-person riding mobile object and an occupant P sits on a driving seat DS and a seat belt SB is fastened. An arrow D1 indicates a traveling direction (a velocity vector) of the mobile object 1. The outside world detection device 10 is provided near a front edge of the mobile object 1, the internal camera 16 is provided at a position at which the head of the occupant P can be imaged from the front of the occupant P, and the mode changeover switch 22 is provided in each of a boss section of the steering wheel WH. The external report device 50 is provided as a display device near a front edge of the mobile object 1.

Referring back to FIG. 1, the storage device 70 is, for example, a non-transitory storage device such as a hard disk drive (HDD), a flash memory, or a random access memory (RAM). The storage device 70 stores map information 72, a program 74 which is executed by the control device 100, and the like. In the drawing, the storage device 70 is illustrated outside of a range of the control device 100, but the storage device 70 may be included in the control device 100.

Control Device

The control device 100 includes, for example, an acquirer 110, a road type recognizer 120, a contact portion recognizer 130, and a controller 140. For example, a hardware processor such as a central processing unit (CPU) executes the program (software) 74 for implementation. Some or all of the constituent elements may be implemented by hardware (a circuit unit including circuitry) such as a large scale integration (LSI), an application specific integrated circuit (ASIC), a field-programmable gate array (FPGA), or a graphics processing unit (GPU) or may be implemented by software and hardware in cooperation. The program may be stored in advance in the storage device 70 or may be stored in a detachably mounted storage medium such as a DVD or a CD-ROM so that the storage medium (a non-transitory storage medium) is mounted on a drive device to be installed on the storage device 70.

The acquirer 110 acquires reference information from the server device 200. The reference information is information with which a facility where an occupant is likely to stop by is identifiable. The reference information includes, for example, some or all of the information to be exemplified below.

(1) The reference information is, for example, information regarding a facility matching information regarding an orientation of an occupant retained in the server device 200 and is, for example, information regarding a facility included in the Recommended POI information 258 for each user.

(2) The reference information is, for example, information which is based on information regarding a facility use history of an occupant. Since the information is information which can be included in the Recommended POI information 258 for each user, the information may be supplied to the acquirer 110 as the reference information which is based on the Recommended POI information 258 for each user or may be supplied alone to the acquirer 110.

(3) The reference information is, for example, information regarding a destination in route guidance performed by the server device 200. The information regarding the destination may be retained on the side of the control device 100 when the information is transmitted from the conversation device 20 to the server device 200.

(4) The reference information is, for example, information regarding an energy supply facility.

The road type recognizer 120 recognizes whether the mobile object 1 is moving on a roadway or a sidewalk. The road type recognizer 120 recognizes whether the mobile object 1 is moving on a roadway or a sidewalk, for example, by analyzing an image captured by an external camera of the outside world detection device 10. An example of image analysis includes semantic segmentation. The road type recognizer 120 classifies pixels of a frame of an image into classes (roadways, sidewalks, boundaries, obstacles, and the like) and performs labeling, recognizes that the mobile object 1 is moving on a roadway when the number of pixels labeled as a roadway in a region equivalent to a front face of the mobile object 1 is large, and recognizes that the mobile object 1 is moving on a sidewalk when the number of pixels in which a label of the sidewalk is granted to a region equivalent to the front face of the mobile object 1 is large in the image. The present invention is not limited thereto. When the road type recognizer 120 recognizes a vehicle in a region equivalent to the front face of the mobile object 1 in the image, the road type recognizer 120 may recognize that the mobile object 1 is moving in the roadway. When the road type recognizer 120 recognizes a pedestrian in a region equivalent to the front face of the mobile object 1 in the image, the road type recognizer 120 may recognize that the mobile object 1 is moving on the sidewalk. When the width of a road surface region in the region equivalent to the front face of the mobile object 1 in the image is large, the road type recognizer 120 may recognize that the mobile object 1 is moving on the roadway. When the width of the road surface region in the region equivalent to the front face of the mobile object 1 in the image is small, the road type recognizer 120 may recognize that the mobile object 1 is moving on the sidewalk. The road type recognizer 120 may combine positional information of the mobile object 1 and the map information 72 and recognize whether the mobile object 1 is moving on a roadway or a sidewalk. In this case, it is necessary for the map information to have accuracy to the degree that the roadway and the sidewalk can be distinguished from each other from positional coordinates. When there is no "predetermined region" in a sidewalk, the road type recognizer 120 performs a similar process on a roadside strip, a bicycle lane, a public open space, or the like.

Figure 6:
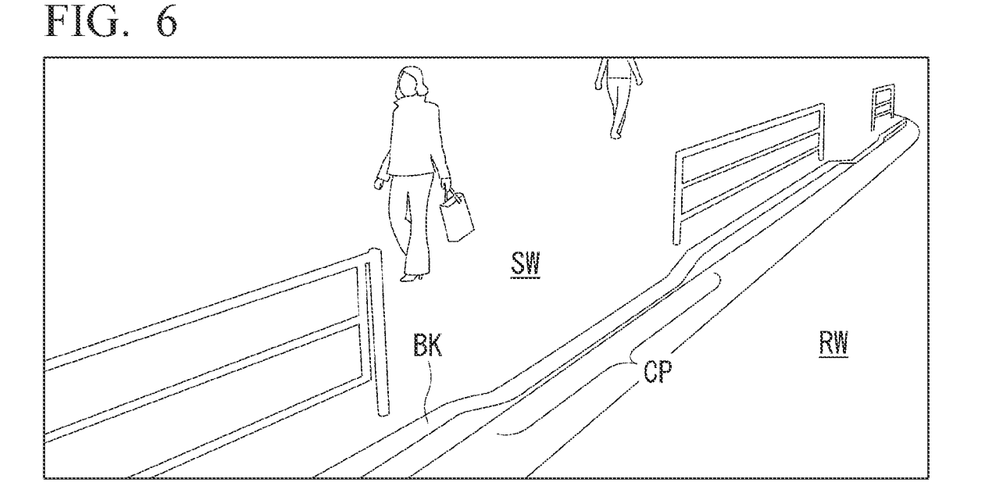
FIG. 6 is a diagram illustrating an exemplary shape of a contact portion.
Figure 7:
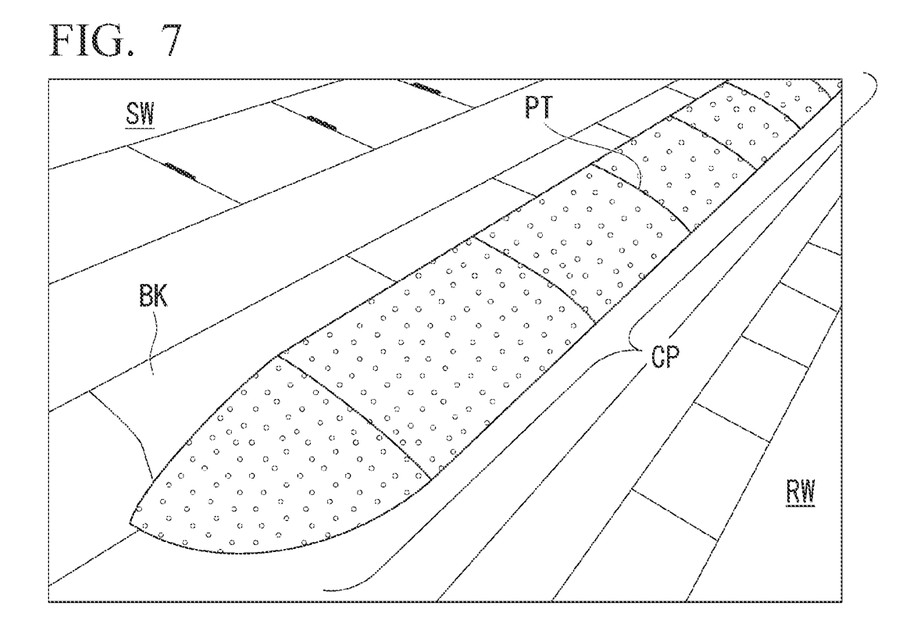
FIG. 7 is a diagram illustrating an exemplary shape of a contact portion.
Figure 8:
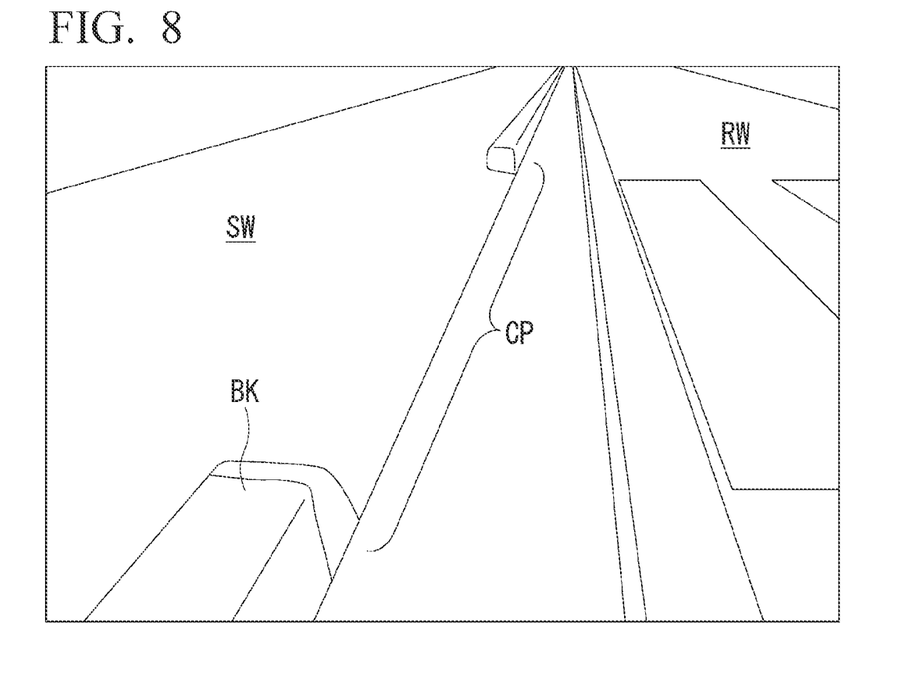
FIG. 8 is a diagram illustrating an exemplary shape of a contact portion.

The contact portion recognizer 130 recognizes presence of a contact portion between a sidewalk and a roadway in a traveling direction of the mobile object. The contact portion is provided at a boundary between a sidewalk and a roadway and is a portion in which a load is less than in other portions of the boundary when the mobile object passes through. For example, when there is a step difference in the boundary between the sidewalk and the roadway, a portion (including a portion in which the sidewalk is flush with the roadway) in which the step difference is alleviated corresponds to a contact portion. FIGS. 6 to 8 are diagrams illustrating an exemplary shape of a contact portion. As illustrated in FIG. 6, the contact portion CP is, for example, a portion in which a block BK of the boundary is lowered together with a sidewalk SW. In the drawing, RW denotes a roadway. As illustrated in FIG. 7, the contact portion CP may be a portion in which a step difference canceling plate PT with which the step difference between the roadway RW and the sidewalk SW is buried is placed. As illustrated in FIG. 8, the contact portion CP may be a portion in which the block BK where there is a step difference between the roadway RW and the sidewalk SW is missing. Apart from these exemplified shapes, the contact portion CP with any of various shapes is assumed. The contact portion CP may be present not only in a portion along the way of a road but also in an intersection or the like. For example, when an image is input, the contact portion recognizer 130 recognizes presence of the contact portion CP by inputting an image captured by an external camera to a learned model that is learned so that information indicating a position of the contact portion CP is output. The contact portion recognizer 130 may recognize presence of the contact portion CP based on the shape of a step difference obtained as a result by performing scanning obliquely downward with an LIDAR.

The controller 140 controls the driving device 40 in accordance with, for example, a set driving mode. The controller 140 derives a state of charge (SOC) of the battery BT based on outputs of the voltage sensor, the current sensor, and the temperature sensor mounted on the battery BT. The SOC of the battery BT is an example of a value indicating a remaining energy amount of the mobile object 1. Instead of this, the SOC may be treated as a value indicating a remaining energy amount such as a reaming gasoline amount, a remaining hydrogen amount of the mobile object 1.

In mode A, the controller 140 controls the driving device 40 such that a distance from an object in front of the mobile object 1 is kept to be a constant value or more when the mobile object 1 is moving on a roadway, and the mobile object 1 is moving at a first speed V1 (for example, a speed equal to or greater than 10 [km/h] and less than tens of [km/h]) when the distance from the object in front of the mobile object 1 is sufficiently long. The controller 140 controls the driving device 40 such that the distance from the object in front of the mobile object 1 is kept to be a constant value or more when the mobile object 1 is moving on a sidewalk, and the mobile object 1 is moving at a second speed V2 (for example, a speed less than 10 [km/h]) when the distance from the object in front of the mobile object 1 is sufficiently long. This function is similar to an adaptive cruise control (ACC) function of a vehicle moving at a speed set as the first speed V1 or the second speed V2 and a technology used for ACC can be used. In mode A, the controller 140 controls a steering angle of a steering wheel based on a manipulation amount of the operator 14 such as a steering wheel. This function is a similar to a function of a power steering device and a technology used for a power steering device can be used. Without performing electronic control on steering, the mobile object 1 may include a steering device to which the operator 14 and the steering mechanism are mechanically connected.

In mode B, the controller 140 controls the driving device 40 based on a speed of the mobile object 1 and a manipulation amount of an accelerator pedal or a brake pedal. The controller 140 controls the driving device 40 such that the first speed V1 is set an upper limit of the speed when the mobile object 1 is moving on a roadway (in the case of mode B, a case in which the speed reaches an upper limit of the speed means that the mobile object 1 cannot be accelerated even if an instruction for further acceleration is given). The controller 140 controls the driving device 40 such that the second speed V2 is set as the upper limit of the speed when the mobile object 1 is moving on a sidewalk. Steering is similar to that of mode A.

In mode C, the controller 140 controls the driving device 40 such that a course and obstacles are detected based on an output of the outside world detection device 10, a target trajectory along which the mobile object 1 can move while avoiding obstacles in the course is generated, and the mobile object 1 moves along the target trajectory. Even in mode C, the controller 140 controls the driving device 40 such that the first speed V1 is set as the upper limit of the speed when the mobile object 1 is moving on a roadway. The controller 140 controls the driving device 40 such that the second speed V2 is set as the upper limit of the speed when the mobile object 1 is moving on a sidewalk. Since mode C is not a core of the present invention, more detailed description will be omitted.

Control in Accordance with Presence of Contact Portion

Hereinafter, control in accordance with presence of a contact portion by the controller 140 will be described in order from mode A. In mode A, the controller 140 determines whether there is a facility where an occupant is likely to stop at on a side on which there is the contact portion from the look of the roadway, with reference to the reference information, when the mobile object 1 is moving on a roadway and a contact portion is recognized within a predetermined range from the mobile object 1. When there is the facility where the occupant is likely to stop at on the side on which there is the contact portion from the look of the roadway, the controller 140 brings the speed of the mobile object 1 closer to the second speed V2 from the first speed V1. "Bringing of the speed of the mobile object 1 closer to the second speed V2 from the first speed V1" means deceleration of the mobile object 1 except for a case in which the mobile object 1 is moving at a low speed or stops in accordance with presence of an unexpected obstacle. At this time, the controller 140 may question an intention to enter a sidewalk using the conversation device 20, may bring the speed of the mobile object 1 closer to the second speed V2 when a positive reply is obtained, and may not bring the speed of the mobile object 1 closer to the second speed V2 when a positive reply is not obtained. Hereinafter, irrespective of whether there is a question, "bringing of the speed of the mobile object 1 closer to the second speed V2 from the first speed V1 when the mobile object 1 is moving on a roadway, a contact portion is recognized within a predetermined range from the mobile object 1, and there is a facility where an occupant is likely to stop at on a side on which there is the contact portion from the look of the roadway" is referred to as specific speed control.

When some or all of "the facility matching the information regarding the orientation of the occupant," "the facility included in the information regarding the facility use history," "the destination in the route guidance," and "the energy supply facility when the remaining energy amount (for example, the SOC of the battery BT) of the mobile object 1 is lower than the reference" acquired from the server device 200 are on the side on which there is the contact portion CP from the look of the roadway, the controller 140 determines that the facility is a facility where the occupant is likely to stop at. "The side on which there is the contact portion CP from the look of the roadway" is, for example, a position facing a left sidewalk (which may be a position communicating via an alley) when the contact portion CP is to the left of a roadway, is a position (which may be the same as above) facing a right sidewalk when the contact portion CP is to the right of a roadway, and is a position range within one block from the center of a position of the mobile object 1.

Figure 9:
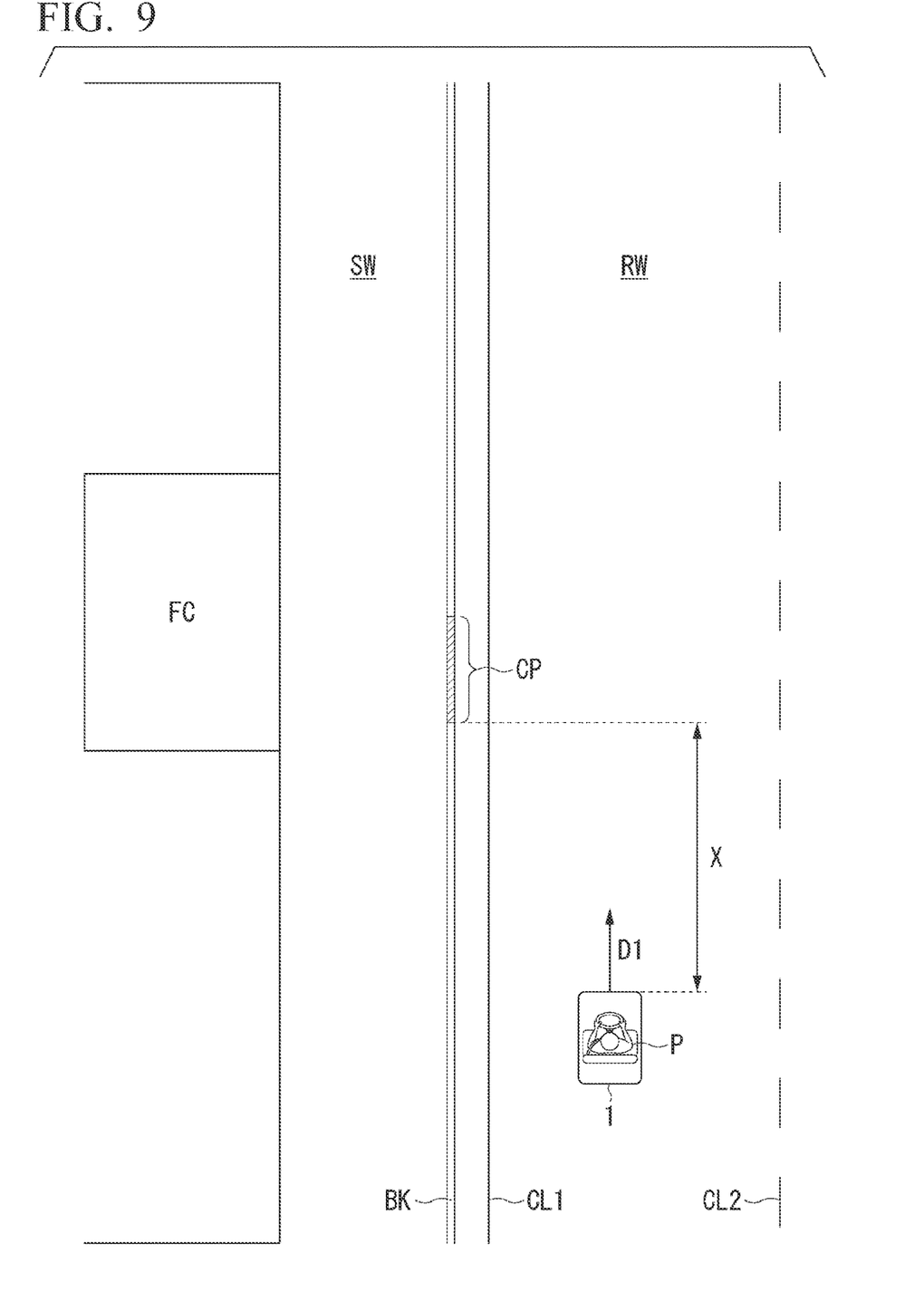
FIG. 9 is a diagram illustrating an example of a scenario in which a specific speed is controlled.

FIG. 9 is a diagram illustrating an example of a scenario in which a specific speed is controlled. In the drawing, X denotes a distance between the mobile object 1 and the contact portion CP. CL1 is a white line indicating a left end of the roadway RW and CL2 is a dashed line demarcating a lane in which there is the mobile object 1 and an opposing lane. The distance X is defined as, for example, a distance between a position of a frontmost side of the contact portion CP and a front end of the mobile object 1. However, the present invention is not limited thereto and any distance such as a distance between the middle of the contact portion CP and the center of the mobile object 1 may be defined. The specific speed control is performed when the distance X is equal to or less than a predetermined distance (which is an example in which the contact portion CP is within a predetermined range from the mobile object 1) and there is the facility FC where an occupant is likely to stop at on a side (for example, within one block) on which there is the contact portion CP from the look of the roadway RW. When the facility FC where an occupant is likely to stop at is an energy supply facility, the controller 140 may decelerate the mobile object 1 and suggest energy replenishment (charging) to the occupant using the conversation device 20.

In mode B, the controller 140 gradually switches the upper limit of the speed of the mobile object 1 from the first speed V1 to the second speed V2 when the mobile object 1 is moving on a roadway, the contact portion is recognized within a predetermined range from the mobile object 1, and there is the facility where the occupant is likely to stop at on the side on which there is the contact portion from the look of the roadway (a further question may be performed for checking). Instead of this, when the foregoing conditions are satisfied in mode B, the controller 140 may make a suggestion using the conversation device 20 so that the speed brings the second speed V2 through a manual manipulation simply using the accelerator pedal AP or the brake pedal BP. For example, the controller 140 causes the conversation device 20 to output a vocal sound "Please reduce speed if you enter sidewalk."

Figure 10:
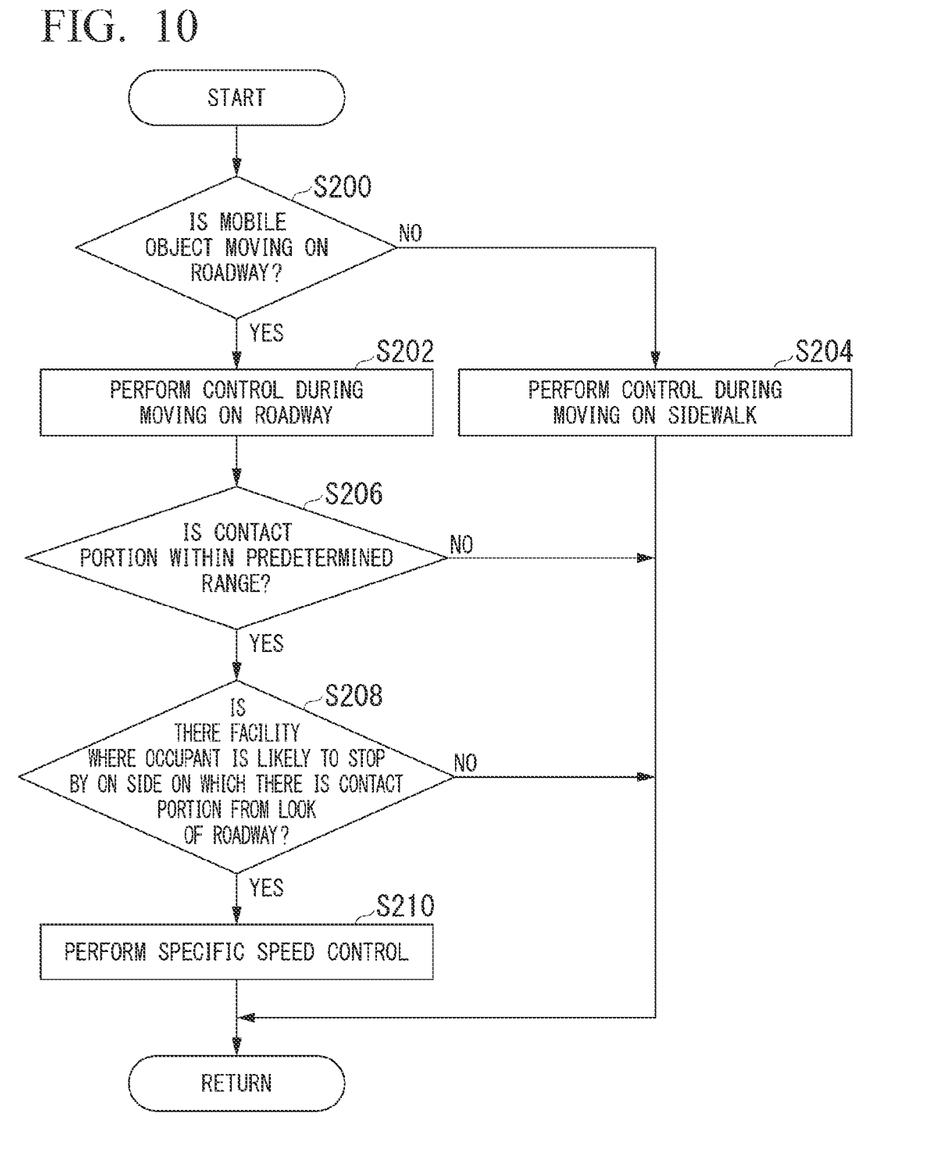
FIG. 10 is a flowchart illustrating an example of a flow of a process performed by the control device according to the embodiment.

FIG. 10 is a flowchart illustrating an example of a flow of a process performed by the control device 100 according to the embodiment. In the process of the flowchart, mode A is a premise. The process of the flowchart is performed repeatedly, for example, at predetermined time intervals.

First, the road type recognizer 120 determines whether the mobile object 1 is moving on a roadway (or is moving on a sidewalk) (step S200). When it is determined that the mobile object 1 is moving on the roadway, the controller 140 performs control of the case in which the mobile object 1 is moving on the roadway, as described above (step S202). Subsequently, based on a recognition result of the contact portion recognizer 130, the controller 140 determines whether the contact portion CP is within the predetermined range in the traveling direction of the mobile object 1 (step S206). When the controller 140 determines that the contact portion CP is within the predetermined range in the traveling direction of the mobile object 1, the controller 140 determines whether there is a facility where an occupant is likely to stop at on a side on which there is a contact portion from the look of the roadway (step S208). When the controller 140 determines that there is the facility where the occupant is likely to stop at, the controller 140 performs the specific speed control (step S210).

When a negative determination result is obtained in step S206 or S208, the process of one routine of the flowchart ends. When it is determined in step S200 that the mobile object 1 is moving on the sidewalk, the controller 140 performs control of the case in which the mobile object 1 is moving on the sidewalk (step S204).

According to the above-described first embodiment, it is possible to appropriately control a mobile object capable of moving on both a roadway and a sidewalk at the time of entrance to the sidewalk from a roadway. Accordingly, when there is the facility where the occupant is likely to stop by on the side on which there is the contact portion from the look of the roadway, a probability of the mobile object 1 entering a sidewalk when the occupant manipulates the steering wheel WH in the approaching contact portion CP is estimated to increase. Incidentally, there is a difference between the first speed V1 which is the speed of the upper limit or a target speed on a roadway and the second speed V2 which is the upper limit of the speed or a target speed on a sidewalk. Therefore, when the mobile object 1 moving at the first speed V1 abruptly enters a sidewalk, a scenario in which sudden deceleration has to be performed can occur. When turning to enter a sidewalk is started during movement at the first speed V1 which is a relatively high speed, there is concern of a large lateral acceleration occurring. That is, there is a possibility of deceleration being late after steering actually starts.

On the other hand, the control device 100 according to the embodiment can inhibit the foregoing sudden deceleration or sudden turning from occurring because of bringing of a speed of the mobile object to the second speed V2 when the mobile object 1 is moving on a roadway, the contact portion CP is recognized within the predetermined range in the traveling direction of the mobile object 1, and there is the facility where the occupant is likely to stop by on the side on which there is the contact portion from the look of the roadway. As a result, it is possible to perform appropriate control at the time of entrance from a roadway to a sidewalk.

Second Embodiment

Figure 11:
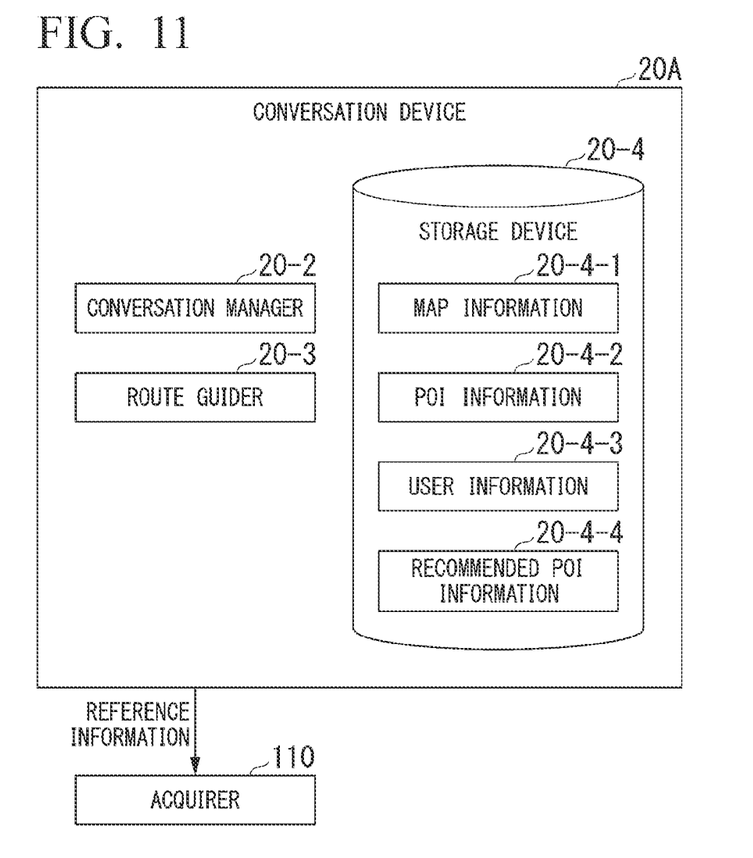
FIG. 11 is a diagram illustrating an exemplary configuration of a conversation device according to a second embodiment.

Hereinafter, a second embodiment will be described. The control device 100 of the second embodiment is different from that of the first embodiment in a method of acquiring the reference information with which "a facility where an occupant is likely to stop by" is identifiable. The control device 100 according to the second embodiment acquires reference information from a storage device mounted in the mobile object 1. FIG. 11 is a diagram illustrating an exemplary configuration of a conversation device 20A according to the second embodiment. The conversation device 20A includes, for example, a conversation manager 20-2, a route guider 20-3, and a storage device 20-4. The storage device 20-4 may be the same as or different from the storage device 70 (see FIG. 1). The storage device 20-4 is, for example, a non-transitory storage device such as an HDD, a flash memory, or a RAM. The storage device 20-4 stores information such as map information 20-4-1, POI information 20-4-2, user information 20-4-3, and recommended POI information 20-4-4.

The conversation manager 20-2 has a function similar to that of the conversation manager 220 in the first embodiment or a simplified function of the conversation manager 220. The route guider 20-3 has a function similar to that of the route guider 230 in the first embodiment or a simplified function of the route guider 230. The map information 20-4-1 is similar to the map information 252 in the first embodiment or is simplified information of the map information 252. The POI information 20-4-2 is similar to the POI information 254 in the first embodiment or is simplified information of the POI information 254. The user information 20-4-3 is similar to the user information 256 in the first embodiment or is simplified information of the user information 256. The recommended POI information 20-4-4 is similar to the recommended POI information 258 for each user in the first embodiment or is simplified information of the recommended POI information 258 for each user. The functions and the information are not limited to a case of completely standalone operation and may be downloaded from an external device such as the server device 200 of the first embodiment through communication as necessary. Accordingly, the conversation device 20 according to the second embodiment may include the communication device 20-1 as in the first embodiment. With this configuration, the reference information is acquired based on the information stored in the storage device 20-4 by the acquirer 110.

According to the above-described second embodiment, it is possible to obtain the same advantages as those of the first embodiment although the scheme of acquiring the reference information is different.

Third Embodiment

Hereinafter, a third embodiment will be described. The control device 100 of the third embodiment is different from that of the first or second embodiment in the function of the road type recognizer 120. The road type recognizer 120 according to the third embodiment recognizes whether the mobile object 1 is traveling on a roadway or a sidewalk, for example, in response to a manipulation of an occupant on a road type input switch (not illustrated) provided in the mobile object. The road type input switch is provided in, for example, a boss section or the like of the steering wheel WH. The road type input switch includes, for example, a mechanism which can be manipulated to upper and lower sides and maintains a manipulated position, indicates a roadway when the road type input switch is manipulated to the upper side, and indicates a sidewalk when the road type input switch is manipulated to the lower side. The road type input switch may be of a button or GUI switch type. When the road type input switch is manipulated in a state in which the control device 100 recognizes that the mobile object is traveling on a sidewalk, the recognition may be switched to recognition during traveling on a sidewalk. When the road type input switch is manipulated in a state in which the control device 100 is traveling on a roadway, the recognition may be switched to recognition during traveling on a roadway. In this configuration, since the function of automatically recognizing whether the mobile object 1 is traveling on a roadway or a sidewalk can be omitted, it is possible to reduce a processing load or cost. Here, since there is a possibility of an erroneous manipulation by an occupant, the external report device 50 preferably reports information to the outside in the third embodiment.

OTHERS

In the foregoing embodiments, the controller 140 may perform the control of only one of mode A and mode B. That is, the mobile object 1 may perform the speed assistance mode and may not perform the manual mode, or may perform the manual mode and may not perform the speed assistance mode. The controller 140 may perform the control of both mode A and mode B, but may perform the specific speed control only when one of mode A and mode B is performed. In any case, whether to perform the control of mode C may be arbitrarily determined.

The embodiments for carrying out the present invention have been described above, but the present invention is not limited to the embodiments. Various modifications and substitutions can be made within the scope of the present invention without departing from the gist of the present invention.

What is claimed is:

1. A mobile object control device comprising:
a storage device storing a program; and
a hardware processor,
wherein the hardware processor executes the program stored in the storage device to:
acquire reference information in which a facility where an occupant is to stop by is registered;
recognize whether a mobile object is moving on a roadway or a predetermined region different from the roadway;
recognize presence of a contact portion between the predetermined region and the roadway in a traveling direction of the mobile object;
control the speed of the mobile object at least partially;
limit a speed of the mobile object moving on the roadway to a first speed;
limit a speed of the mobile object moving on the predetermined region to a second speed lower than the first speed; and
bring a speed of the mobile object to the second speed when the mobile object is moving on the roadway, the contact portion is recognized within a predetermined range from the mobile object, and it is determined with reference to the reference information that there is a facility where the occupant is to stop by on a side on which there is the contact portion from the look of the roadway.

2. The mobile object control device according to claim 1, wherein the hardware processor questions about an intention to enter the predetermined region using an interface device when the mobile object is moving on the roadway, the contact portion is recognized within a predetermined range from the mobile object, and it is determined with reference to the reference information that there is the facility where the occupant is to stop by on the side on which there is the contact portion when seen from the look of the roadway, and brings the speed of the mobile object the second speed when a positive response is obtained.

3. The mobile object control device according to claim 1,
wherein the hardware processor acquires the reference information from another device through a communication device, and
wherein the other device retains information regarding an orientation of the occupant and information regarding the facility and transmits information regarding the facility matching the information regarding the orientation of the occupant as the reference information to the communication device.

4. The mobile object control device according to claim 1,
wherein the hardware processor acquires the reference information from another device through a communication device, and
wherein the other device retains information regarding a facility use history of the occupant and transmits information which is based on the information regarding the facility use history as the reference information to the communication device.

5. The mobile object control device according to claim 1,
wherein the hardware processor acquires the reference information from another device through a communication device, and
wherein the other device is a device that performs route guidance through the communication device and transmits information regarding a facility set as a destination by the occupant as the reference information to the communication device.

6. The mobile object control device according to claim 1,
wherein the hardware processor acquires the reference information from another device through a communication device,
wherein the other device is a device that retains information regarding an energy supply facility and transmits information regarding the energy supply facility as part of the reference information to the communication device, and
wherein the hardware processor further acquires information regarding a remaining energy amount of the mobile object as another part of the reference information and determines that the energy supply facility is a facility where the occupant is to stop by when a value indicating the remaining energy amount of the mobile object is less than a reference.

7. The mobile object control device according to claim 1,
wherein the hardware processor acquires the reference information from a storage device mounted in the mobile object,
wherein the storage device retains information regarding an orientation of the occupant and information regarding a facility, and
wherein the hardware processor acquires information regarding a facility matching the information regarding the orientation of the occupant as the reference information.

8. The mobile object control device according to claim 1,
wherein the hardware processor acquires the reference information from a storage device mounted in the mobile object, and
wherein the storage device retains information regarding a facility use history of the occupant and the acquirer acquires information which is based on the information regarding the facility use history as the reference information.

9. The mobile object control device according to claim 1, wherein the hardware processor acquires information regarding a facility set as a destination by the occupant as the reference information from a device that is mounted in the mobile object and performs route guidance.

10. The mobile object control device according to claim 1,
wherein the hardware processor acquires information regarding an energy supply facility as part of the reference information from a storage device that is mounted in the mobile object and retains the information regarding the energy supply facility, further acquires information regarding a remaining energy amount of the mobile object as another part of the reference information, and determines that the energy supply facility is a facility where the occupant is to stop by when a value indicating the remaining energy amount of the mobile object is less than a reference.

11. The mobile object control device according to claim 1, wherein the hardware processor recognizes whether the mobile object is moving on the roadway or the predetermined region based on an output of an outside world detection device detecting an outside situation of the mobile object.

12. The mobile object control device according to claim 1,
wherein the hardware processor recognizes whether the mobile object is moving on the roadway or the predetermined region based on a manipulation of the occupant on a switch provided inside the mobile object.

13. The mobile object control device according to claim 1,
wherein the hardware processor recognizes that the mobile object is moving on the predetermined region, the hardware processor causes an external report device to report the mobile object which is moving on the predetermined region to the outside of the mobile object.

14. A mobile object control method using a computer controlling a mobile object on which at least one occupant gets and which is capable of moving both on a roadway and a predetermined region different from the roadway, the method comprising:
acquiring reference information in which a facility where an occupant is to stop by is registered;
recognizing whether a mobile object is moving on the roadway or the predetermined region;
recognizing presence of a contact portion between the predetermined region and the roadway in a traveling direction of the mobile object;
controlling the speed of the mobile object at least partially;
limiting a speed of the mobile object moving on the roadway to a first speed;
limiting a speed of the mobile object moving on the predetermined region to a second speed lower than the first speed; and
bringing a speed of the mobile object to the second speed when the mobile object is moving on the roadway, the contact portion is recognized within a predetermined range from the mobile object, and it is determined with reference to the reference information that there is a facility where the occupant is to stop by on a side on which there is the contact portion from the look of the roadway.

15. A mobile object control device comprising:
a storage device storing a program; and
a hardware processor,
wherein the hardware processor executes the program stored in the storage device to:
acquire reference information in which a facility where an occupant is to stop by is registered;
recognize whether a mobile object is moving on a roadway or a predetermined region different from the roadway;
recognize presence of a contact portion between the predetermined region and the roadway in a traveling direction of the mobile object;
control the speed of the mobile object at least partially;
limit a speed of the mobile object moving on the roadway to a first speed;
limit a speed of the mobile object moving on the predetermined region to a second speed lower than the first speed; and
suggest deceleration to the occupant using an interface device when the mobile object is moving on the roadway, the contact portion is recognized within a predetermined range from the mobile object, and it is determined with reference to the reference information that there is a facility where the occupant is to stop by on a side on which there is the contact portion from the look of the roadway.

16. A mobile object control method using a computer controlling a mobile object on which at least one occupant gets and which is capable of moving both on a roadway and a predetermined region different from the roadway, the method comprising:
acquiring reference information in which a facility where an occupant is to stop by is registered;
recognizing whether a mobile object is moving on the roadway or the predetermined region;
recognizing presence of a contact portion between the predetermined region and the roadway in a traveling direction of the mobile object;
controlling the speed of the mobile object at least partially;
limiting a speed of the mobile object moving on the roadway to a first speed;
limiting a speed of the mobile object moving on the predetermined region to a second speed lower than the first speed; and
suggesting deceleration to the occupant using an interface device when the mobile object is moving on the roadway, the contact portion is recognized within a predetermined range from the mobile object, and it is determined with reference to the reference information that there is a facility where the occupant is to stop by on a side on which there is the contact portion from the look of the roadway.

* * * * *